E. M. RECKARDS.
AUTOMATIC STOCK DIPPING TANK.
APPLICATION FILED APR. 28, 1908.
934,571.
Patented Sept. 21, 1909.
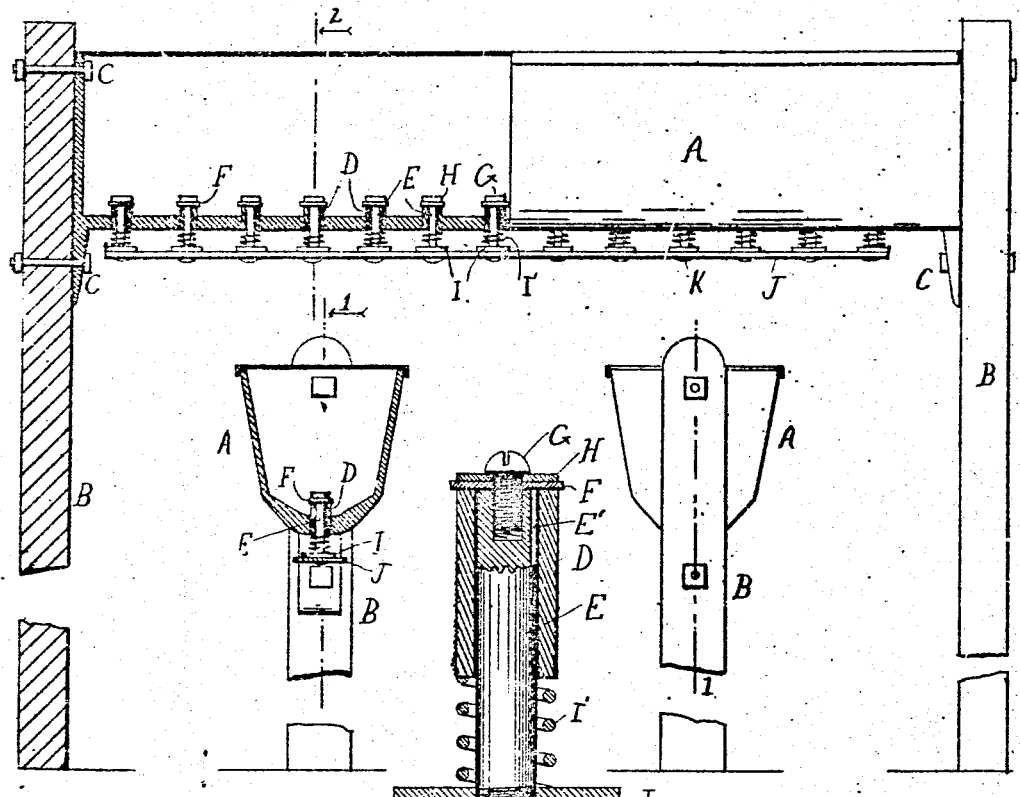
Figure 1. Fig. 2. Fig. 3.
Fig. 4.
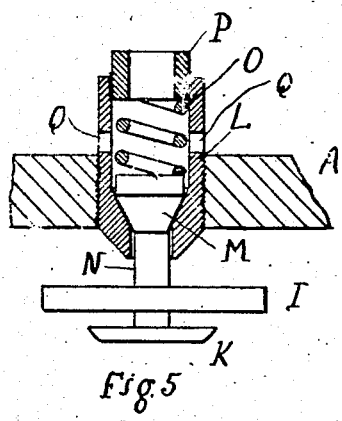
Fig. 5.
Witnesses
John A Hult
L. A. Rosen
Inventor
Edwin M. Reckards
By J. A. Rosen
atty

UNITED STATES PATENT OFFICE.

EDWIN M. RECKARDS, OF OZAWKIE, KANSAS.

AUTOMATIC STOCK-DIPPING TANK.

934,571.  Specification of Letters Patent.  Patented Sept. 21, 1909.

Application filed April 28, 1908. Serial No. 429,767.

*To all whom it may concern:*

Be it known that I, EDWIN M. RECKARDS, a citizen of the United States, residing at Ozawkie, in the county of Jefferson and State of Kansas, have invented a new and useful Improvement in Automatic Stock-Dipping Tanks, of which the following is a specification.

My invention is a device intended to serve the purpose that the large dipping tanks serve, in treating all kinds of live stock to crude-oil, or other suitable liquid, for disinfecting and ridding the stock of such diseases as may be thus treated.

It is the object of my invention to provide a device of this kind, which may be made up cheaply and sold to the individual farmer at a low price, and yet which is practicable and efficient, thus providing each farmer or stock-raiser with his own dipping plant, instead of necessitating treatment only at the regular dipping stations. And in order that it may not be necessary to keep a large tank filled with the liquid in which the stock is immersed, I provide a small long tank which is elevated above the ground, being supported, for instance, by two end posts, just high enough that the stock will rub their necks against the under side of the tank; and in the bottom of the tank are a number of valves which are opened automatically when rubbed underneath, thus permitting a small quantity of the liquid to run out and down on the animal's neck or back. Of course, it will be understood that circumstances will dictate in a measure where each tank is to be placed as well as the height above the ground. Thus it may be placed in a field in a place where the afflicted animals will rub up against it; or it may be placed over a gate through which hogs pass, etc.

In the drawings accompanying and forming part of this specification and in the description of the drawings, I have shown my invention in its preferred forms, and have shown the best mode of applying the principles thereof; but it is to be understood that I contemplate changes in form, proportions, and materials, the transposition of parts, and the substitution of equivalent members, without departing from the spirit of the invention; within the scope of the appended claims.

Figure 1 is a view showing a tank made in accordance with my invention from end to end, the left half being a vertical center section through the line 1 of Figs. 2 and 3. Fig. 2 is a cross sectional view through the line 2 of Fig. 1. Fig. 3 is an end view. Fig. 4 is a vertical center sectional view of one of the valves, enlarged. Fig. 5 is a similar view of a modified form of valve.

Similar reference characters indicate like or corresponding parts throughout the several views.

A is a tank for containing the liquid; it may be of any suitable size, shape, and material; thus, for convenient use, portability, etc., it may be approximately ten inches wide at the top, ten inches deep, and several feet long; of the shape shown in the drawings; and of cast iron. As I contemplate that the valves, which are in the bottom of the tank shall be operated by the animal rubbing its neck or back against it, it is necessary that a suitable means be provided for supporting the tank at a proper elevation above the ground; thus, I have shown the two end posts B, B, which may be set in the ground and to which the tank may be bolted by bolts C, C.

D, D represent a series of valve seats screwed into the bottom of the tank. Through each valve seat extends a stem E with a longitudinal groove E' and provided at its upper end with a leather or rubber washer F, which forms the valve seated on the valve seat D, and which is held in place by the screw G and metal washer H. The lower end of the stem E extends out from the bottom of the tank and is provided with a washer I, and to the under side of the washers is secured a strip of cloth, or canvas or other suitable flexible material J, by means of the tap K.

I' is a coil spring for normally holding the valve closed.

The strip J makes a comparatively smooth and agreeable surface for the animal to rub against, and insures the operation of the valves.

Referring to Fig. 5: L is the valve seat which may be screwed through the bottom of the tank. M is the valve seated therein, and N is the stem provided with washer I and tap K. O is a compression spring inserted above the valve for normally holding it closed, being retained in position by the plug P, while Q, Q are holes through the valve seat to permit the liquid to flow thereinto from the bottom of the tank.

What I claim is:

1. The combination of an elongated tank, means for supporting the tank above the ground so as to permit livestock to rub against the under side of the tank, a series of valves arranged in the bottom of the tank so as to be closed with the pressure of liquid in the tank and opened against said pressure, a stem for each valve terminating below the bottom of the tank, and a continuous flexible covering or said terminals forming a smooth and yielding surface against which the animals may rub, substantially as set forth.

2. The combination of an elongated tank, means for supporting the tank above the ground, a series of valves arranged in the bottom of the tank, a spring coöperating with the pressure of liquid in the tank for closing each valve, a stem for each valve terminating underneath the tank, and a continuous flexible covering for the terminals of all said valve stems, substantially as set forth.

3. The combination of an elongated tank adapted to be supported above the ground, a series of valves arranged in the bottom of the tank, a valve stem for each valve terminating under the bottom of the tank, and a continuous flexible covering for all said valve stems, substantially as set forth.

In testimony whereof I have hereunto signed my name in the presence of witnesses.

EDWIN M. RECKARDS.

Witnesses:
HAZEL D. RICHARDSON,
J. O. DILL.